United States Patent [19]

Morrison et al.

[11] 4,168,136
[45] Sep. 18, 1979

[54] SELF-THREADING RIBBON CONVEYOR

[75] Inventors: Herbert M. Morrison, Trumbull; Gerald M. Smith, Norwich, both of Conn.

[73] Assignee: Eagle-Picher Industries, Incorporated, Cincinnati, Ohio

[21] Appl. No.: 920,788

[22] Filed: Jun. 30, 1978

[51] Int. Cl.² ........................................... B29C 17/10
[52] U.S. Cl. ............................... 425/302.1; 425/403.1; 425/DIG. 46
[58] Field of Search ...................... 425/289, 302.1, 308, 425/397, 406, 403.1, DIG. 46, 810, 290

[56] References Cited

U.S. PATENT DOCUMENTS

| | | | |
|---|---|---|---|
| 3,113,905 | 12/1963 | Rosen | 425/810 |
| 3,157,914 | 11/1964 | Deibel et al. | 425/406 X |
| 3,189,399 | 6/1965 | Jacobs et al. | 425/302.1 X |
| 3,193,881 | 7/1965 | Kosten | 425/302.1 X |
| 3,240,851 | 3/1966 | Scalora | 425/302.1 X |
| 3,605,192 | 9/1971 | Edwards | 425/397 X |
| 3,759,650 | 9/1973 | Grinei et al. | 425/302.1 |

Primary Examiner—J. Howard Flint, Jr.
Attorney, Agent, or Firm—Garold E. Bramblett, Jr.

[57] ABSTRACT

A continuous ribbon of moldable material is fed from a plasticizing mill through a stamping section of a molding machine and is returned to the mill as mill stock. The ribbon of moldable material is carried through the stamping section by an endless chain conveyor having prongs spaced therealong. The prongs are pressed into the ribbon as it is drawn from the plasticizing mill. Then, the ribbon is supported by trays as it is drawn along a feed path through the stamping section. The prongs are pulled from the ribbon once the ribbon has been directed by the conveyor back toward the plasticizing mill.

At the stamping section, bites are taken from the edge of the ribbon by a die to provide blanks of molding stock to the molding machine. The ribbon is guided by edge guides along a transversely movable supporting tray. The chain conveyor rides in a trough adjacent the tray. By moving the tray and trough away from the stamping die, the mill may be operated continuously even with the mold shut down. As the tray is moved, either to remove the ribbon from the stamping die or to adjust the amount of bite taken from the ribbon, a floating sprocket follows the chain. A variable speed drive to the conveyor chain tracks the mill speed and corrects for ribbon shrinkage and expansion.

15 Claims, 4 Drawing Figures

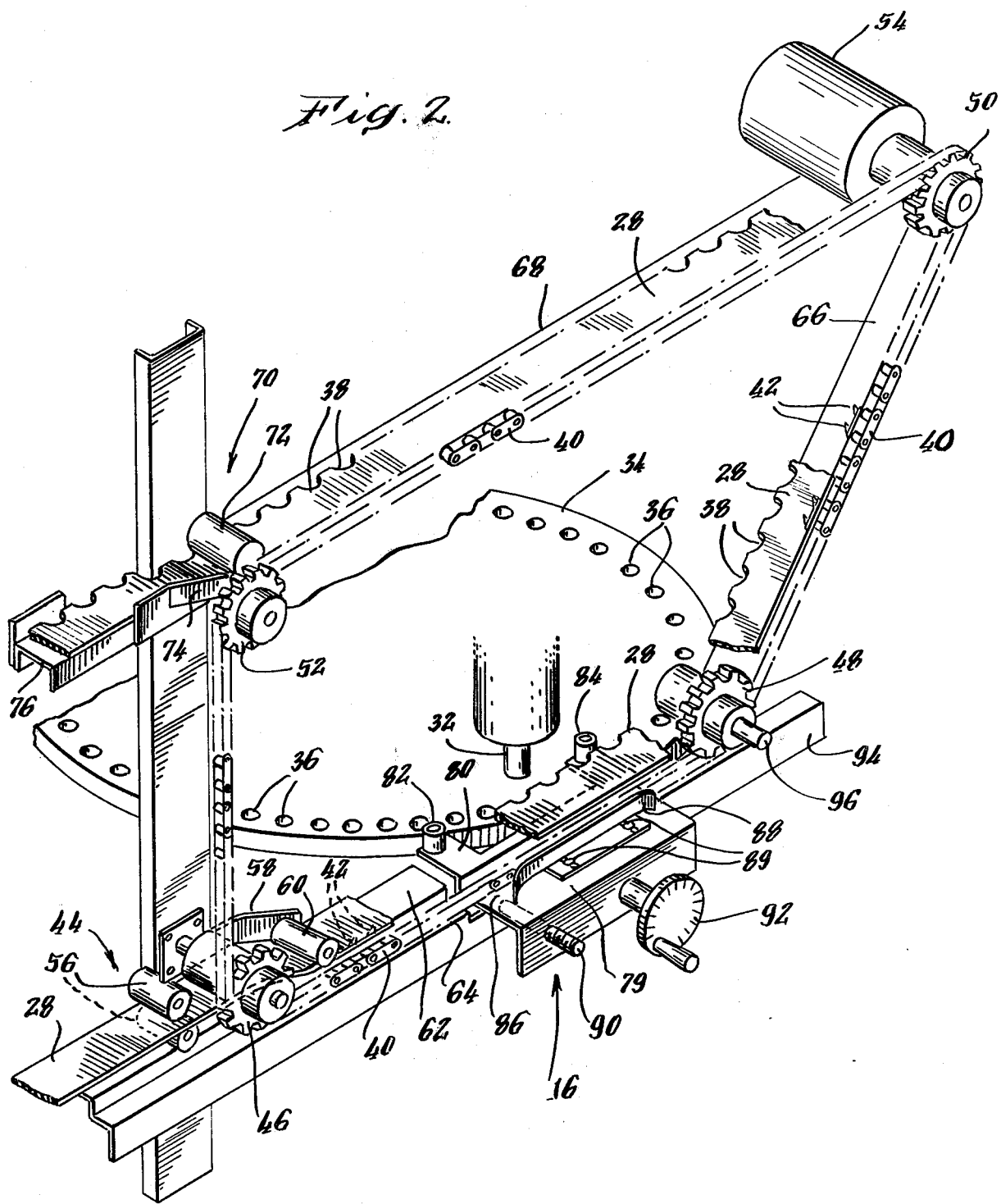

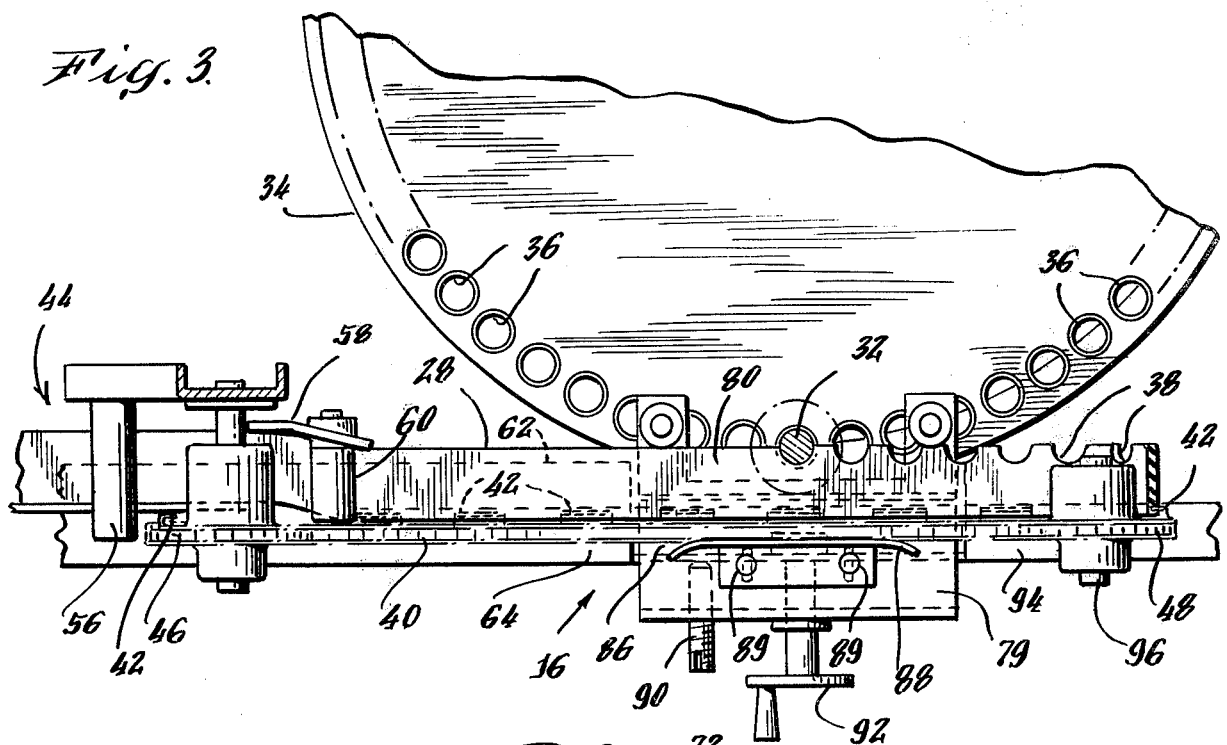
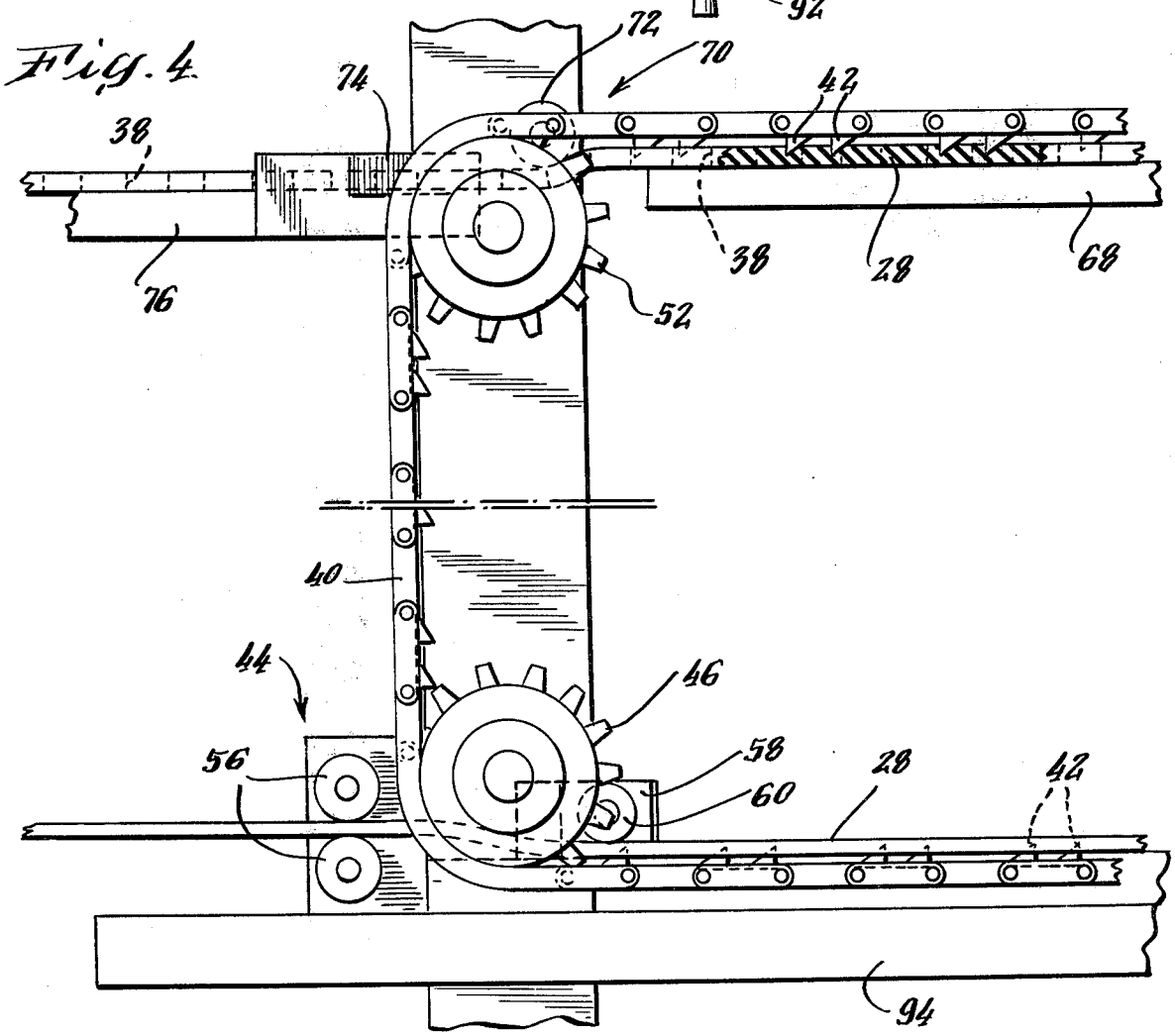

SELF-THREADING RIBBON CONVEYOR

BACKGROUND OF THE INVENTION

This invention relates to milling and molding apparatus and particularly to such apparatus in which blanks of molding stock are stamped from a continuously moving ribbon of moldable material taken from a plasticizing mill and returned to the mill after stamping.

In molding machines such as disclosed in the Gora U.S. Pat. Nos. 2,548,305, 2,745,135, and 2,952,035, moldable material is taken from a plasticizing mill in the form of a continuous ribbon and passed through a stamping section of the molding machine. Blanks of molding stock are then stamped from the ribbon and inserted in bottle caps or the like for subsequent molding therein. The remaining part of the ribbon continues through the stamping section and is returned to the plasticizing mill as mill stock. The milling and molding operations are continuous with fresh mill stock being added to supplement the returned ribbon. In those prior milling and molding apparatus, the ribbon of moldable material is drawn from the plasticizing mill and through the stamping section by pinch rollers positioned along the return path of the ribbon to the mill.

In the above systems, the ribbon is of uncured rubber and is subject to shrinkage and breakage. With breakage, the plasticizing mill continues to output ribbon which must be manually threaded through the system, including stamping section, until it is again gripped by the pinch rollers. This requires the operator to handle the ribbon near the stamping section where injury to the operator from the stamping die is a likely result.

An object of this invention is to provide a self-threading ribbon feed for feeding a ribbon of moldable material from a plasticizing mill through a stamping section of a molding machine, and for returning the ribbon to the mill.

A further object of this invention is to provide a ribbon feeding system wherein the stretching of the ribbon is reduced and which provides for ease in tracking the speed of the mill with compensation for stretching and shrinkage which does result.

In prior milling and molding machines the plasticizing mill operates continuously even when the molding machine is shut down. As a result, when the molding machine is shut down, it is customary to cut the ribbon and feed it manually back to the mill in order to bypass the molding machine. Such cutting and manual feeding of the ribbon is not only an inconvenience; it makes poor use of the operator's time and, with rethreading, presents a danger to the operator. There is also the risk of overloading the mill with manual return of the cut ribbon.

It is thus a further object of this invention to provide a system for feeding ribbon through a stamping section which will operate continuously even when the molding machine is shut down.

In prior milling and molding apparatus it is also difficult to regulate the bite of moldable material taken from the ribbon for each blank of molding stock.

A further object of this invention is to provide a precision mold bite control capable of reproducible initial settings.

SUMMARY

In a milling and molding apparatus in which a continuous ribbon of molding material is fed from a plasticizing mill through a stamping section where blanks of molding stock are stamped therefrom, and is then returned as mill stock to the plasticizing mill, an endless conveyor extends along a ribbon feed path through the stamping section. Gripping means are carried by the endless conveyor along its length and grip the ribbon along a length thereof to draw the ribbon along its feed path through the stamping section. Means are also provided for releasing the gripping means from the ribbon as the ribbon is returned to the plasticizing mill.

In accordance with a further aspect of this invention, the stamping section includes a ribbon supporting tray and a ribbon edge guide extending from the tray to precisely guide the stamped edge of the ribbon. The tray and edge guide are movable to move the ribbon out of its stamping position without interrupting feed of the ribbon.

In accordance with further aspects of the invention, the means for gripping the ribbon includes prongs extending from a conveyor chain, and the prongs are pressed into the ribbon to draw the ribbon through the stamping section and are pulled away from the ribbon when the ribbon is returned to the plasticizing mill. The ribbon is supported by trays along a substantial portion of its feed path to reduce stretching of the ribbon.

BRIEF DESCRIPTION OF THE DRAWINGS

The foregoing and other objects, features, and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

FIG. 2 is a perspective view of a ribbon-feeding endless conveyor embodying the invention;

FIG. 3 is a plan view of the lower run of the ribbon and conveyor of FIG. 2;

FIG. 4 is a side view of the ribbon coupling and releasing portions of the conveyor of FIG. 2.

DESCRIPTION OF A PREFERRED EMBODIMENT

Figure 1:
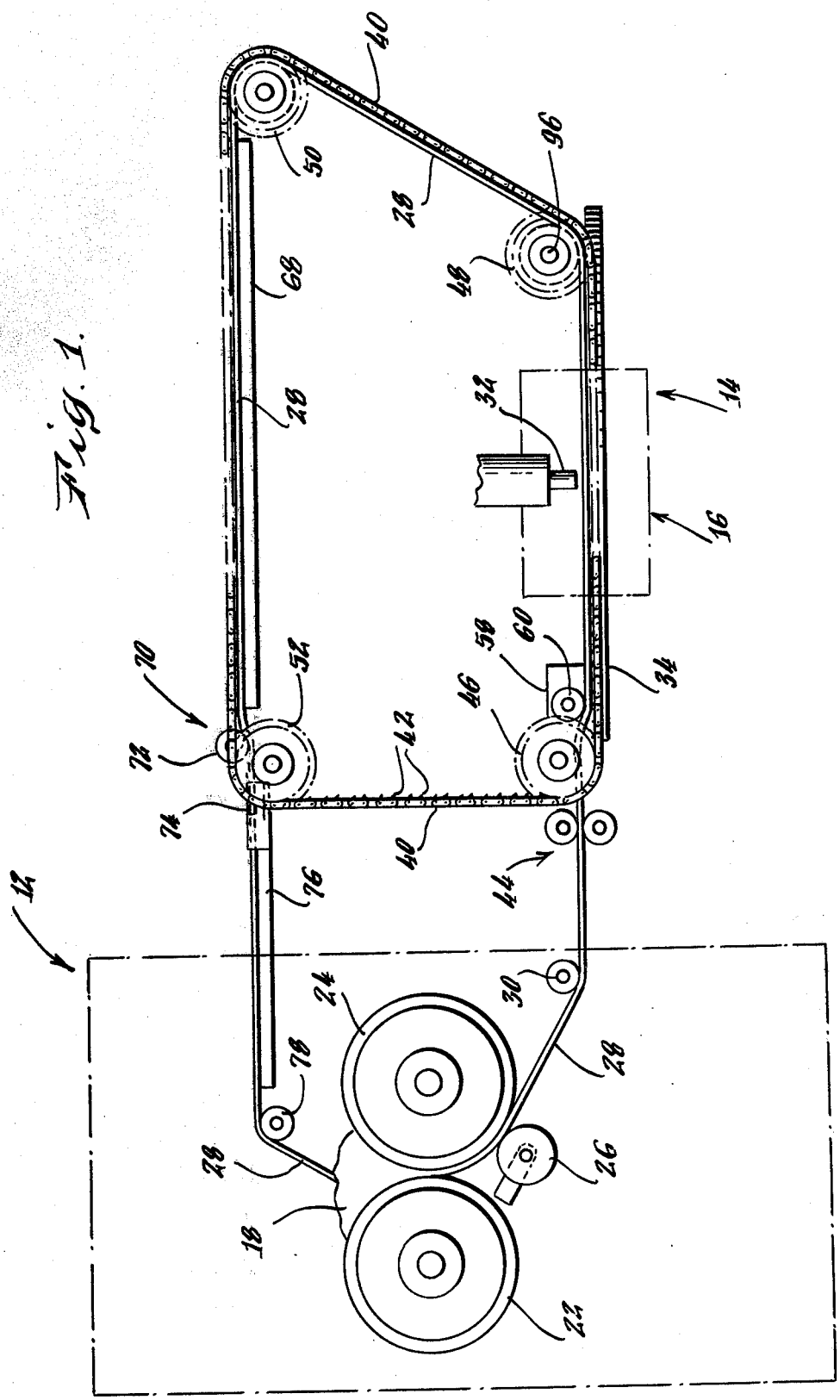
FIG. 1 is a schematic illustration of a milling and molding apparatus in which a ribbon of moldable material is, in accordance with the invention, drawn by an endless conveyor from a plasticizing mill through a stamping section of a molding machine and is returned to the plasticizing mill.

As shown in FIG. 1, a milling and molding apparatus includes a plasticizing mill 12 and a molding machine 14. The molding machine 14 has a stamping section 16.

In the plasticizing mill 12, a bank of mill stock 18 is warmed and pressed between mill rollers 22 and 24. A layer of moldable material is formed on the roller 24, and from this layer a continuous ribbon 28 is cut by spaced knives including knife 26. The ribbon 28 is passed around roll 30 and fed through the stamping section 16 of the molding machine 14.

At the stamping section (FIG. 2), a die 32 takes bites from the edge of the ribbon to provide blanks of molding stock which are successively set on seats 36 on a drum 34. The blanks of molding stock may, for example, be placed directly inside caps so that the molding stock may subsequently be molded into the caps as gaskets.

Having passed through the stamping section, the ribbon 28 continues with notches 38 therein and is returned to the bank of mill stock 18 where it is recycled with additional fresh stock.

The milling and molding apparatus as thus far described is substantially in accordance with the Gora machines. In accordance with the present invention, an endless conveyor chain 40 is engaged by four sprocket wheels 46, 48, 50 and 52. Sprocket wheel 50 is driven by a variable speed motor 54 in a counterclockwise direction as viewed in FIG. 2. The conveyor chain 40 carries prongs 42 which extend inwardly from the chain along its length. These prongs are pressed into the bottom side of the ribbon 28 at a coupling area 44 and thus grip the ribbon to carry it along the ribbon feed path through the stamping section 16.

As illustrated in FIGS. 2 through 4, the ribbon 28 first passes between snubber rollers 56 of a ribbon thickness gauge. The ribbon passes to the far side of the chain 40 and is then deflected by an angle guide 58 (FIG. 4). The angle guide 58 pushes the ribbon out so that it edges over the lower run of prongs 42 carried by chain 40. Then, a coupler roller 60 presses the ribbon downwardly against the prongs so that the prongs are pressed into and embedded in the ribbon. With the prongs 42 securely embedded therein, the ribbon 28 is drawn along a stationary supporting tray 62 by the chain conveyor 40. The chain 40 rides adjacent the tray 62 but at a lower level.

The ribbon is drawn by the chain conveyor 40 and prongs 42 through the stamping section 16 past sprocket wheel 48 and upwardly along a stationary diagonal tray 66. The ribbon then passes sprocket wheel 50 and is drawn along upper support tray 68 to a decoupling area 70.

Along the upper run of the conveyor chain, the chain is spaced over the ribbon and support tray 68. Thus, at the decoupling area 70 in the vicinity of sprocket wheel 52, a decoupling roller 72 presses downwardly against the ribbon 28 to release the ribbon from the grip of the prongs 42. In order that the chain 40 can then pass downwardly past the ribbon toward the coupling station 44, the ribbon 28 is pushed away from the sprocket wheel 52 and chain 40 by an angle guide 74.

With the ribbon 28 thus decoupled from the conveyor chain 40, it is pushed along a tray 76. It passes around a guide roll 78 to be returned to the bank of mill stock material 18.

By means of the above described conveyor system, a ribbon of molding stock material may be automatically threaded through the stamping section 16 and then be automatically returned to the plasticizing mill. The ribbon is simply inserted between snubber rollers 56 and pushed beyond the sprocket wheel 46 until the ribbon is engaged by prongs 42 on the conveyor chain 40. With the prongs thus gripping the ribbon, the ribbon is drawn through the stamping section, over support trays, through the decoupling area, and back to the plasticizing mill.

By providing support trays along the feed path of the ribbon, stretching of the ribbon due to sagging is substantially eliminated. It is to this end that the ribbon passes diagonally, rather than vertically, from the lower run to the upper run of the conveyor.

The drive motor 54 is a variable speed motor which is electronically controlled to track the mill speed while further compensating for shrinkage and stretching of the ribbon.

As will now be described, the stamping section of the conveyor system includes means for removing the ribbon from below the die 32. The means for moving the ribbon also allows for precisely adjusting the amount of bite taken from the ribbon by the die 32 in order to precisely set the amount of molding stock in each blank of stock. As best shown in FIG. 2, the ribbon conveying means includes a transversely slidable platform 79 in the stamping section. The platform 79 includes a tray 80 for supporting the conveyed ribbon 28. Rollers 82 and 84 extend upwardly from the tray 80 and serve as a ribbon edge guide for precisely guiding the stamped edge of the ribbon through the stamping station. The chain 40 rides within a trough 86 adjacent the tray 80 and is retained against the tray 80 by a chain guide 88. The position of the chain guide 88 relative to the edge guide rollers 82 and 84 is adjustable for varying widths of ribbon by adjusting screws 89.

The position of the platform 79 relative to a stationary frame 94 and thus to the die 32 is adjustable by a course adjusting screw 90. The precise position is set by a fine adjusting screw controlled by a graduated dial 92.

The bite adjusting controls 90 and 92 can also be used to completely remove the ribbon from below the die 32 in the event that the molding apparatus 14 is shut down. With the platform 79 backed completely away from the die 32, the ribbon continues to feed from the plasticizing mill 12, and the conveyor 40 continues to return the ribbon to the bank of mill stock 18. Thus, cutting the ribbon and manually returning it to the bank of mill stock 18 is obviated.

In order to prevent undue stress on the conveyor system when the ribbon is backed away from the die, the sprocket wheel 48 is axially floatable along its shaft 96. As the platform 79 moves out, the sprocket wheel 48 also moves out. The change is conveyor length due to transverse movement of the platform 79 is thus distributed between sprocket wheels 46 and 50.

From the above, it is apparent that the described self-threading ribbon conveyor reduces stretching and breakage of a ribbon of moldable material by gripping that ribbon with prongs spaced along an endless conveyor and drawing the ribbon along supporting trays through the stamping section and back toward the plasticizing mill. In the event that the ribbon is cut or breaks, it is not necessary that the operator handle the ribbon through the stamping area to rethread the ribbon. Further, precise control of the bite is possible by means of a transversely slidable tray. As a result, the system is capable of reproducible initial settings from written setup instructions. Also, the ribbon can be completely removed from the mold area to permit continuous automatic feeding of the ribbon back to the plasticizing mill despite shutdowns of the molding machine.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. In a milling and molding apparatus in which a continuous ribbon of moldable material is fed from a plasticizing mill through a stamping section where blanks of molding stock are stamped therefrom, and is then returned as mill stock to the plasticizing mill, that improvement comprising a ribbon conveying means including:

an endless conveyor extending along a ribbon feed path through said stamping section;

means for driving said endless conveyor along said ribbon feed path;

gripping means carried by said endless conveyor along its length for gripping said ribbon of moldable material along a length thereof to draw said ribbon along said feed path through said stamping section; and means for releasing said gripping means from said ribbon once said conveyor has directed said ribbon back toward said plasticizing mill.

2. An improvement in a milling and molding apparatus as claimed in claim 1 wherein said ribbon conveying means includes stationary ribbon supporting trays along a substantial portion of said ribbon feed path.

3. An improvement in a milling and molding apparatus as claimed in claim 1 wherein said gripping means includes prongs spaced along said conveyor and said prongs grip said ribbon when pressed into the ribbon.

4. An improvement in a milling and molding apparatus as claimed in claim 3 wherein said endless conveyor is a chain.

5. An improvement in a milling and molding apparatus as claimed in claim 1 wherein said endless conveyor is transversely movable in said stamping section to prevent stamping of blanks from said ribbon while said conveyor continues to draw said ribbon along said ribbon feed path.

6. An improvement in a milling and molding apparatus as claimed in claim 5 wherein said endless conveyor is a chain and said chain passes around an axially floating sprocket wheel adjacent said stamping section.

7. An improvement in a milling and molding apparatus as claimed in claim 5 wherein said endless conveyor is transversely movable to a lesser degree to adjust the amount of molding stock stamped from said ribbon.

8. An improvement in a milling and molding apparatus as claimed in claim 5 wherein said ribbon conveying means includes a transversely movable ribbon supporting tray in said stamping section and a ribbon edge guide extending from said tray to precisely guide a stamped edge of said ribbon through said stamping section.

9. An improvement in a milling and molding apparatus as claimed in claim 8 wherein said endless conveyor is a chain and said ribbon conveying means includes a transversely movable trough adjacent said ribbon supporting tray for guiding said chain through said stamping section.

10. An improvement in a milling and molding apparatus as claimed in claim 1 wherein said means for driving said endless conveyor tracks the speed of said plasticizing mill.

11. In a milling and molding apparatus in which a continuous ribbon of moldable material is fed from a plasticizing mill through a stamping section where blanks of molding stock are stamped therefrom, and is then returned as mill stock to the plasticizing mill, that improvement comprising a ribbon conveying means including:

an endless conveyor extending along a ribbon feed path through said stamping section;

means for driving said endless conveyor along said ribbon feed path;

prongs carried by and extending from said endless conveyor along its length;

means between said plasticizing mill and said stamping section for pressing said prongs into said ribbon to grip said ribbon and draw it along said feed path through said stamping section;

a transversely movable ribbon supporting tray in said stamping section and a ribbon edge guide extending from said tray to precisely guide a stamped edge of said ribbon through said stamping section, said tray and edge guide being movable to prevent stamping of blanks from said ribbon without interrupting feed of said ribbon through said stamping section; and means for pulling said prongs from said ribbon once said endless conveyor has directed said ribbon back toward said plasticizing mill.

12. An improvement in a milling and molding apparatus as claimed in claim 11 wherein said ribbon conveying means includes stationary ribbon supporting trays along a substantial portion of said ribbon feed path.

13. An improvement in a milling and molding apparatus as claimed in claim 11 wherein said endless conveyor is a chain and said chain passes around an axially floating sprocket wheel adjacent said stamping section.

14. An improvement in a milling and molding apparatus as claimed in claim 11 wherein said endless conveyor is a chain and said ribbon conveying means includes a transversely movable trough adjacent said ribbon supporting tray for guiding said chain through said stamping section.

15. An improvement in a milling and molding apparatus as claimed in claim 11 wherein said means for driving said endless conveyor tracks the speed of said plasticizing mill.

* * * * *